(12) United States Patent
Cook

(10) Patent No.: US 6,450,379 B1
(45) Date of Patent: Sep. 17, 2002

(54) APPARATUS FOR SUPPORTING A LOAD FROM A VEHICLE

(76) Inventor: W. Anthony R. Cook, 2853 Old Waterman Canyon Rd., San Bernardino, CA (US) 92404

(*) Notice: Subject to any disclaimer, the term of this patent is extended or adjusted under 35 U.S.C. 154(b) by 0 days.

(21) Appl. No.: 09/801,147

(22) Filed: Mar. 6, 2001

(51) Int. Cl.⁷ .................................................. B60R 9/00
(52) U.S. Cl. ..................... 224/405; 211/41.14; 224/488; 224/492; 224/494; 224/501; 224/512; 224/518; 224/521; 224/546; 224/560; 224/561
(58) Field of Search ................................. 224/560, 561, 224/546, 489, 492, 494, 501, 518, 403, 405, 512, 521; 211/41.14

(56) References Cited

U.S. PATENT DOCUMENTS

| | | |
|---|---|---|
| 2,649,909 A | 7/1953 | Barden |
| 2,672,265 A | 3/1954 | Milstead |
| 2,678,150 A | 5/1954 | Lund |
| 2,680,544 A | 6/1954 | Hunt, Sr. et al. |
| 4,007,864 A * | 2/1977 | Hreha ......................... 211/113 |
| 4,927,032 A * | 5/1990 | Mercure ..................... 211/41.14 |
| 4,944,434 A * | 7/1990 | Hamilton ..................... 224/482 |
| 5,255,951 A | 10/1993 | Moore, III |
| 5,518,156 A | 5/1996 | Lehman |
| 5,678,743 A | 10/1997 | Johnson et al. |
| 6,193,123 B1 * | 2/2001 | Adamczewski et al. . 211/41.14 |

* cited by examiner

*Primary Examiner*—Stephen K. Cronin
*Assistant Examiner*—Maerena W. Brevard
(74) *Attorney, Agent, or Firm*—Sheldon & Mak

(57) ABSTRACT

A load carrying vehicle accessory includes rear, medial, and front carrier units each, having a laterally extending chassis-mounted socket member that telescopically receives a sleeve having a pair of posts thereon, the posts having adjustable spacing from a side extemity of the vehicle. The socket members can be clamped under the vehicle chassis and/or incorporated in vehicle bumpers. An optional configuration has front and/or rear mounted a base to which the socket member is pivotally mounted as an arm, the posts being foldable in-line with the arm, the arm also folding inwardly from the side of the vehicle.

19 Claims, 3 Drawing Sheets

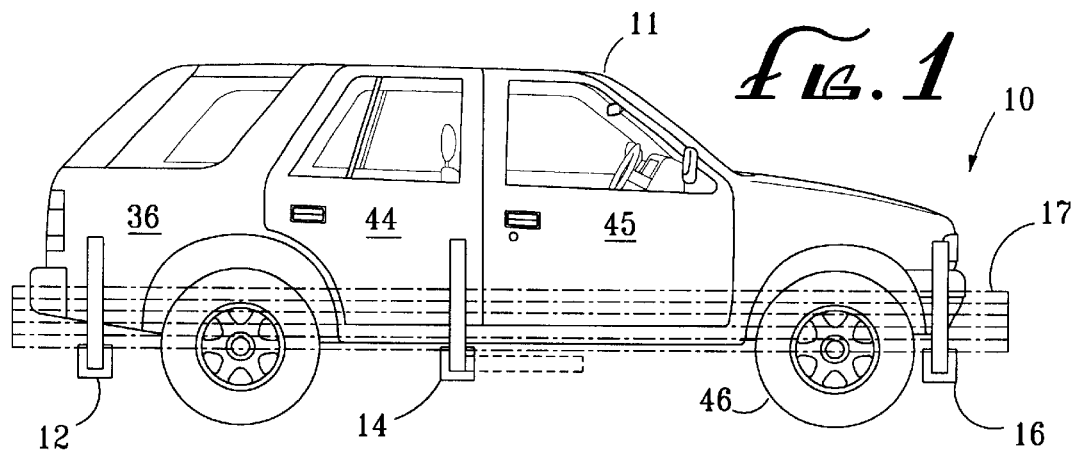
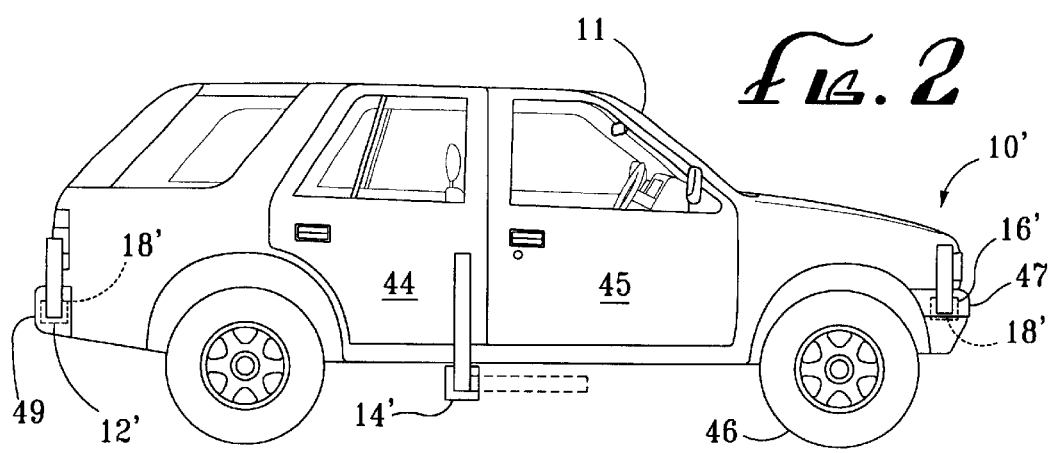
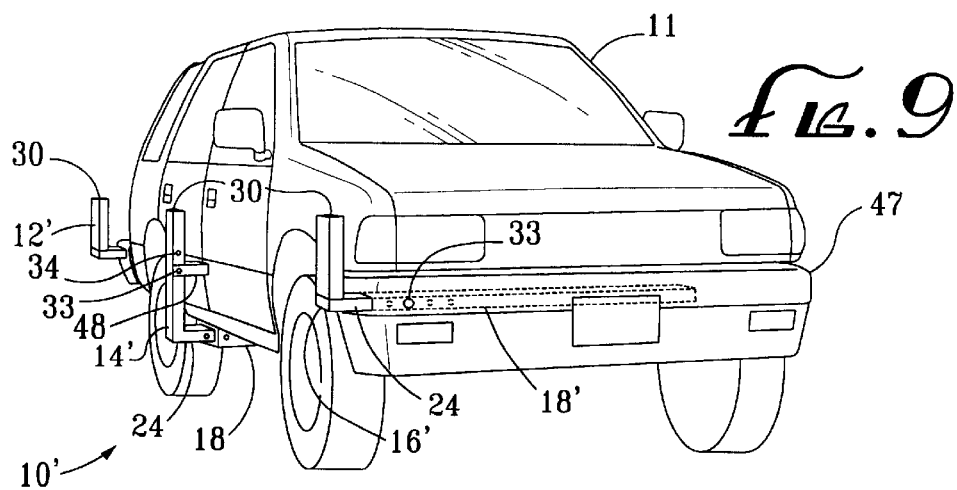

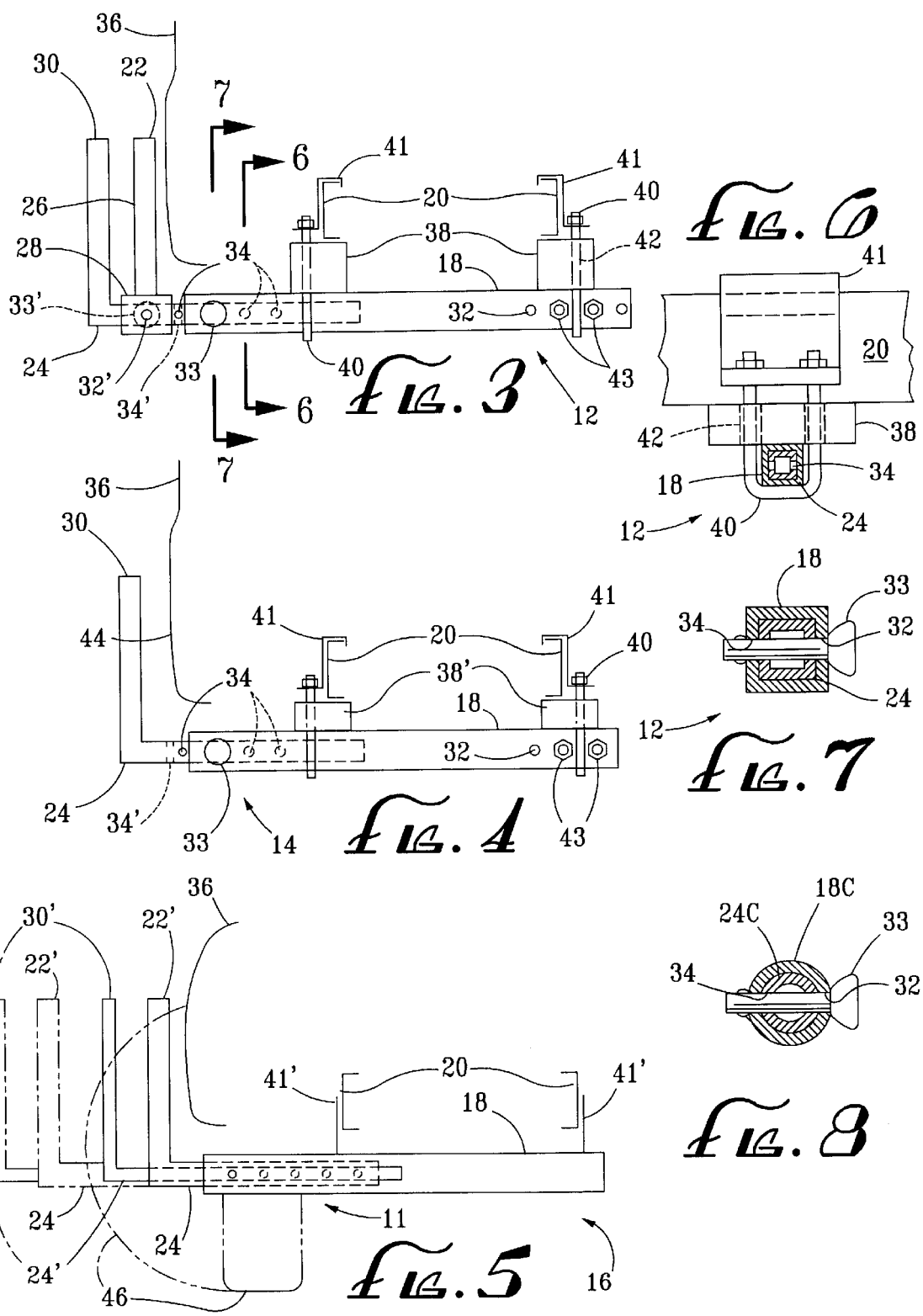

APPARATUS FOR SUPPORTING A LOAD FROM A VEHICLE

BACKGROUND

The present invention relates to vehicle cargo carrier devices, and more particularly to apparatus for carrying a load externally alongside a vehicle.

Side racks and similar devices for carrying elongate loads by a vehicle are known, being disclosed, for example in U.S. Pat. No. 2,646,909 to Barden, U.S. Pat. No. 2,672,265 to Milstead, U.S. Pat. No. 2,678,150 to Lund, U.S. Pat. No. 2,680,544 to Hunt, Sr., et al., and U.S. Pat. No. 5,255,951 to Moore, III. These devices of the prior art have a number of disadvantages; for example:

1. They cannot be used on large numbers of vehicles in that they require specific mounting provisions such as stake pockets;
2. They are difficult to use in that they require brackets or other attachments that are custom designed for specific vehicles;
2. They require mounting holes to be drilled in body parts or other undesirable visible modifications to vehicles on which they are used;
3. They are unsightly, particularly when not in use carrying a load; and
4. They are unsafe in that they require the load to be carried undesirably high on the vehicle, contributing to instability.

Thus there is a need for a vehicle cargo carrier that overcomes the disadvantages of the prior art.

SUMMARY

The present invention meets this need by providing a vehicle accessory that is particularly versatile, and effective for use carrying elongate loads, yet is unobtrusive when not in use. In one aspect of the invention, apparatus for carrying a load externally of a vehicle includes a longitudinally spaced plurality of carrier units, each of the carrier units having a socket member; means for mounting the socket member transversely to a chassis of the vehicle, an outside extremity of the socket member projecting to proximate alignment with a side extremity of the vehicle body; a sleeve member telescopically receivable in the socket member; a post member; means for holding the post member upwardly projecting from the sleeve member when the sleeve member is in the socket member; means for securing the post member selectively in plural fixed axial locations relative to the socket member for supporting the load above the sleeve member, wherein at least some of post members are locatable for laterally restraining opposite sides of the load, and the post member of at least one of the carrier units is selectively locatable in fixed axial locations relative to the sleeve member of the at least one carrier unit.

The means for mounting of at least one of the carrier units can include a pair of brackets for laterally spaced engagement with the chassis, and a pair of U-bolts, each of the U-bolts being configured for engaging a corresponding one of the brackets and fixedly clamping the socket member relative to the chassis. The means for mounting can also include a pair of spacers for clamped location between the socket member and the chassis proximate respective ones of the U-bolts. The brackets can be formed for hook-engagement with the chassis, respective portions of the chassis being clamped between corresponding brackets and the socket member by respective ones of the U-bolts when the socket member is clamped relative to the chassis.

The means for securing the post member of at least one of the carrier units can have a lock pin that is selectively engagable with plural axially spaced discontinuities of the sleeve member through a lock opening of the socket member. The means for holding that post member upwardly projecting can include the axially spaced discontinuities of the sleeve member being formed as index openings for receiving the lock member, rotation of the sleeve member within the socket member being prevented by the lock member. Also, or in the alternative, the means for holding that post member upwardly projecting can include the sleeve member and the socket member being formed for non-circularly cylindrical telescopic engagement. The sleeve member and the socket member can be rectangular in cross-section. Further, the means for holding can further include the post member being rigidly connected to the sleeve member. Preferably the sleeve member is telescopically engageable with the socket member in a first orientation wherein the post member projects vertically from the sleeve member, and a second orientation wherein the post member projects horizontally from the sleeve member. For this purpose, the sleeve member and the socket member can be square in cross-section.

The post member of the at least one carrier unit can be an outboard post member being rigidly connected to the sleeve member, the carrier unit further including an inboard post member rigidly connected to a collar member, the collar member having telescopic engagement with the sleeve member. The means for securing can include a first lock pin engagable with a selected one of axially spaced discontinuities of the sleeve member through a lock opening of the socket member, and a second lock pin engagable with another of the discontinuities through a lock opening of the collar member. The collar member can be telescopically engagable between the sleeve member and the socket member, and the means for securing can include a lock pin engagable with a selected one of axially spaced discontinuities of the sleeve member through a lock opening of the socket member and a selected one of axially spaced index openings of the collar member.

The apparatus can be provided in combination with the vehicle. The socket member of at least one of the carrier units can form a portion of a bumper of the vehicle.

The apparatus can also have a base for fixed mounting near an end portion of the vehicle, with the socket member of at least one of the carrier units being pivotally connected to the base on a pivot axis as an arm having a deployed position extending laterally with a free end of the arm forming the outside extremity of the socket member, and a retracted position projecting oppositely from the pivot axis; the post member being an outboard post member connected to the sleeve member for supporting the load against lateral movement away from the body of the vehicle; and an inside post member hingedly connected to the arm proximate the free end thereof, the inside post member having a deployed position projecting upwardly from the arm in the deployed position thereof for laterally spacing the load away from the side extremity of the body, and a folded position extending approximately parallel to the arm. The outboard post member can be hingedly connected to the sleeve member, for movement between a deployed position for the supporting of the load and a folded position extending approximately parallel to the sleeve member, the sleeve member and the outboard post member in the folded position thereof being retractable into the arm to near the free end thereof.

DRAWINGS

These and other features, aspects, and advantages of the present invention will become better understood with reference to the following description, appended claims, and accompanying drawings, where:

FIG. 1 is a side perspective view of a utility vehicle equipped with a cargo carrier apparatus according to the present invention;

FIG. 2 is a perspective view as in FIG. 1, showing an alternative configuration of the apparatus of FIG. 1;

FIG. 3 is a front view showing a rear unit portion of the apparatus of FIG. 1 as mounted on the vehicle;

FIG. 4 is a front view showing a medial unit portion of the apparatus of FIG. 1 as mounted on the vehicle;

FIG. 5 is a front view showing a front unit portion of the apparatus of FIG. 1 as mounted on the vehicle;

FIG. 6 is a fragmentary sectional view of the rear unit portion of FIG. 3 on line 6—6 thereof;

FIG. 7 is a fragmentary sectional view of the rear unit portion of FIG. 3 on line 7—7 thereof;

FIG. 8 is a fragmentary sectional view as in FIG. 7, showing an alternative configuration of the rear unit portion of FIG. 3;

FIG. 9 is a front-oblique perspective view of the vehicle and the apparatus of FIG. 2;

DESCRIPTION

Figure 10:
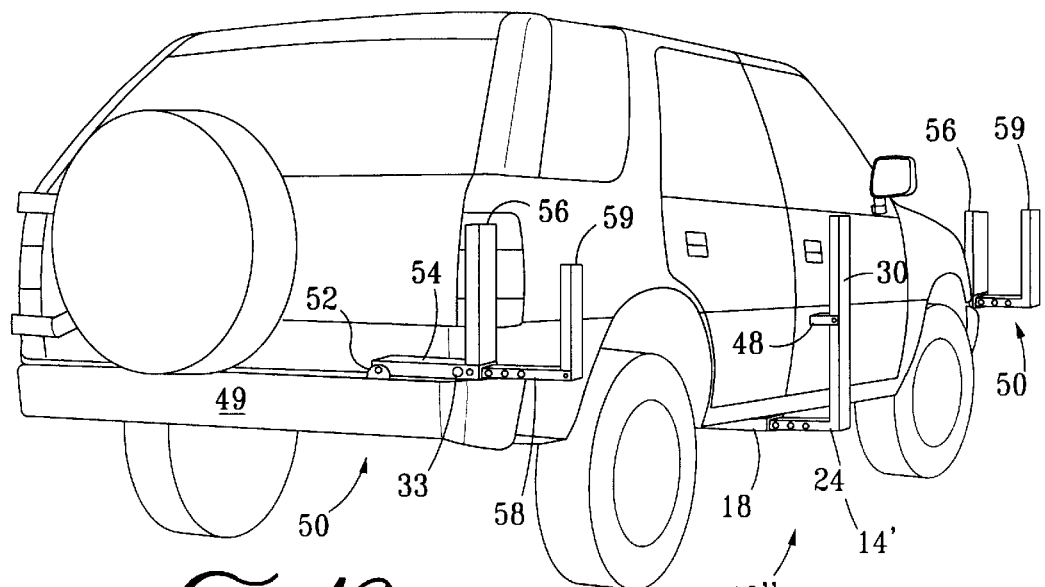
FIG. 10 is a rear-oblique perspective view showing another alternative configuration of the apparatus of FIG. 1.

The present invention is directed to a cargo carrier that is particularly effective for carrying elongate loads on a variety of vehicles. With reference to FIGS. 1 and 3–7 of the drawings, a cargo carrier apparatus 10 for a vehicle 11 includes a rear carrier unit 12, a medial carrier unit 14, and a front carrier unit 16, an elongate load 17 being supported and confined by the carrier units 12, 14 and 16. It will be understood that for some loads, inclusion of two only of the carrier units 12, 14, and 16 in the apparatus 10 may be satisfactory. As shown in FIGS. 3 and 6, the rear carrier unit 12 includes a tubular socket member 18 that is transversely mounted under a chassis 20 of the vehicle 11 behind a rear wheel 21 thereof. An inboard post 22 of the rear carrier unit 12 is adjustably supported on a sleeve member 24 that telescopically engages the socket member 18. More particularly, the inboard post 22 includes a column member 26 that projects rigidly perpendicularly from a collar member 28, the collar member slidably engaging the sleeve member 24. The sleeve member 24 also has an outboard post 30 rigidly perpendicularly projecting from an outer extremity thereof. The socket member 18 has a lock opening 32 formed in opposite walls thereof for receiving a lock pin 33, the sleeve member 24 having a plurality of index openings 34 formed therethrough whereby the sleeve member can be selectively locked at a desired axial position relative to the socket member.

Similarly, the collar member 28 has a counterpart of the lock opening, designated 32', formed through opposite walls thereof for receiving a counterpart of the lock pin, designated 33' (shown with broken lines to signify insertion opposite the lock pin 33), whereby the inboard post 22 can be selectively locked at a desired spacing from the outboard post 30. It will be understood that it is possible to have the index openings 34 arranged such that the lock pin 33 is engagable with the sleeve member 24 fully retracted, the inboard post 22 being fixedly confined between the sleeve member 24 and the outboard post 30. Advantageously, and as shown in FIGS. 6 and 7, the socket member 18, the sleeve member 24, and the collar member 28, are each uniformly square in cross-section. This or other non-circularly cylindrical cross-sectional configuration maintains an upstanding orientation of the inboard and outboard posts 22 and 30 when the lock pins 33 and 33' are withdrawn, thereby facilitating adjustment of the inboard and outboard posts 22 and 28 to desired lateral positions relative to an adjacent portion of a body 36 of the vehicle 11, for accommodating and confining a rear portion of the load 17 in spaced relation to the body 36. This square cross-sectional configuration also permits insertion of the sleeve member 24 orthogonally oriented as described below relative to the medial carrier unit 14, for which a counterpart of the index opening, designated 34', is provided in the sleeve member 24 for securing the sleeve member fully retracted with the inboard post 22 and the outboard post 30 extending horizontally.

The socket member 18 of the rear carrier unit 12 is preferably mounted in rigid relation to the vehicle chassis 20 without modification of the vehicle itself. In one exemplary implementation, a spaced pair of spacers 38 are clamped between the chassis 20 and the socket member 18 by a corresponding pair of U-bolts 40, the U-bolts 40 also engaging respective brackets 42 that have hook-engagement with the chassis 20. Thus portions of the chassis are clamped between the brackets 42. Alternatively, the brackets can be connected to the chassis 20 by any suitable means such as rivets, screws, or by welding. As further shown in FIG. 3, the spacers 38 have clearance openings 42 through which the U-bolts 40 extend for locating and stabilizing the spacers. Also, spaced counterparts of the lock opening 32 are formed in the socket member 18 for receiving a pair of stop fasteners 43 on opposite sides of one of the U-bolts 40. The stop fasteners, or other elements projecting from the socket member on opposite sides of a U-bolt 40 thus prevent or limit lateral movement of the socket member in case of loosening of the U-bolts 40.

As shown in FIG. 4, the medial carrier unit 14 is configured similarly to the rear carrier unit 12, having counterparts of the socket member 18, the sleeve member 24, the outboard post 30, and the lock pin 33. Typically, the chassis 20 at that location is lower than at the location of the rear carrier unit 12. Thus the carrier unit 14 is mounted using counterparts of the spacers, designated 38', being lower in height than the spacers 38 of FIGS. 3 and 6. In many cases, moreover, the chassis 20 extends below the body 36 at the location of the medial carrier unit 14, the spacers 38' not being required. Also, the exemplary configuration of the medial carrier unit 14 does not include the inboard post 22, such being optional in view of the inclusion of inboard and outboard posts in the front carrier unit 16 as described below.

The square cross-sectional configuration of the socket member 18 and the sleeve member 24 described above and shown in FIGS. 6 and 7 advantageously permits the sleeve member 24 to be inserted with the outboard post 30 projecting horizontally forwardly as indicated by broken lines in FIG. 1 (or rearwardly) with respect to the orientation shown in FIG. 4 and indicated by solid lines in FIG. 1 for clearing a door 44 of the vehicle 11. A counterpart of the index opening 34' is also provided in the sleeve member 24 of the medial carrier unit 14 for receiving the lock pin 33 as described above to hold the sleeve member 24 retracted with the outboard post 30 in the horizontally projecting orientation. The door 44 is a rear door of the exemplary vehicle 11 shown in the drawings, the medial carrier unit 14 being located slightly behind a front door 45 of the vehicle 11. It will be understood that the medial carrier unit 14 is normally preferred to be located behind the front door 45, particularly when the vehicle 11 does not have a counterpart of the rear door 44 (unless the front door 45 extends so far rearwardly that the medial carrier unit 14 would be ineffective if located further rearwardly, or if the chassis configuration is unsuitable at locations between the front door 45 and the rear wheel 21).

As shown in FIG. 5, the front carrier unit 16 includes counterparts of the socket member 18 and the sleeve member 24, the sleeve member having a counterpart of the inboard post, designated 22', orthogonally rigidly projecting therefrom. The socket member 18 can be anchored to the chassis 20 as described above in connection with FIGS. 3, 4, and 6, or with counterparts of the brackets, designated 41', being welded to the socket member 18 and fastened to the chassis 20. A counterpart of the outboard post, designated 30', orthogonally rigidly projects from a counterpart of the sleeve member, designated 24', that telescopically engages the sleeve member 24. In this configuration, the sleeve member 24' corresponds to the sleeve member 24 of FIG. 3, and the sleeve member 24 of FIG. 5 corresponds to the collar member 28 of FIG. 3, but having telescopic engagement with both the sleeve member 24' and the socket member 18, with counterparts of the index openings 34 being formed in both of the sleeve members 24 and 24'. Thus a single lock pin 33 is effective for securing the sleeve members 24 and 24' relative to the socket member 18. As indicated in FIG. 5, the front carrier unit 16 is adapted for locating the inboard and outboard posts 22' and 30' sufficiently spaced from the vehicle body 36 to clear a front wheel 46 of the vehicle 11. It will be understood that the outboard post 30 of the medial carrier unit 14 will be positioned at an intermediate spacing from the body 36 relative to that of the rear and front carrier units 12 and 16 for accommodating and supporting a center portion of the load 17 when the front carrier unit 16 is adjusted for greater spacing to a front portion of the load 17 than such spacing of the rear portion of the load.

It will be appreciated that when the load 17 is sufficiently stiff, adequate support is provided by two only of the carrier units 12, 14, and 16. Further, lateral stability of the load 17 can be provided by the outboard post 30 of the medial carrier unit 14 in combination with the inboard posts 22 and 22' of the rear and front carrier units 12 and 16. Conversely, with the medial carrier unit 14 being configured to include a counterpart of the inboard post 22, lateral stability of the load 17 can be provided by the inboard post 22 of the medial carrier unit 14 in combination with the outboard posts 30 and 30' of the rear and front carrier units 12 and 16. Normally, however, the load 17 is to be stabilized between pairs of posts of at least two of the carrier units.

With further reference to FIG. 8, an alternative configuration of the rear carrier unit 12 of FIGS. 3, 6, and 7) as well as of the medial carrier unit 14 of FIG. 4 and the front carrier unit 16 of FIG. 5 has counterparts of the socket member, designated 18C, and the sleeve member, designated 24C, being circular in cross-section. While this configuration lacks the advantages of the above-described square cross-sectional configurations, suitable materials for these components, as well as a circularly cylindrical counterpart of the sleeve member 24' of FIG. 5, may be more readily available. Also, it may be possible to adapt an existing bumper component of the vehicle 11 to form the socket member 18C, by the simple expedient of forming the lock opening 32 therein.

With further reference to FIGS. 2 and 9, an alternative configuration of the carrier apparatus, designated 10', incorporates an elevated counterpart of the front carrier unit, designated 16', whereby clearance of the front wheel 46 is maintained at reduced spacing of the front portion of the load from the vehicle body 36. A counterpart of the socket member, designated 18', is supported by or forms a portion of a front bumper 47 of the vehicle. In this configuration, the middle portion of the load is normally carried higher than a lower extremity of the vehicle body 36. Accordingly, the apparatus 10' includes a counterpart of the medial carrier unit, designated 14', wherein the outboard post 30 has a support member 48 rigidly inwardly projecting therefrom for spacing the center portion of the load 17 above the sleeve member 24. It will be understood that the load spacer 48 can be permanently affixed as shown in FIG. 9, or it can be removable and/or adjustable for accommodating different lateral spacing adjustments of the medial and front carrier units 14' and 16'. The load spacer 48 can be secured to the outboard post 30 by a counterpart of the lock pin 33', with multiple counterparts of the lock opening 32 and/or the index opening 34 being formed in the post 30 and the support 48 being optionally provided for vertical adjustment of the support 48. As further shown in FIGS. 2 and 9, the rear carrier unit 12' is configured as a counterpart of the front carrier unit 16', having the socket member 18' enclosed within a rear bumper 49 of the vehicle 11, the socket member 18' of the rear carrier 12' being typically somewhat lower than that of the front carrier unit 16'.

With further reference to FIGS. 10–13, another alternative configuration of the carrier apparatus, designated 10", includes a folding carrier unit 50 that can be used in place of either or both of the rear and front carrier units 12 and 16. The carrier unit 50 includes a base 52, an arm 54 that is pivotally connected to the base on a longitudinal first pivot axis 55, a free extremity of the arm 54 having an inboard post 56 pivotally connected thereto on a longitudinal second pivot axis 57. A sleeve member 58, having an outboard post 59 pivotably connected thereto on a third pivot axis 60, is telescopically received in the arm 54, being secured at a desired extension by a counterpart of the lock pin 33', the lock pin 33' also securing the inboard post 56 in orthogonally projecting relation to the arm 54. The arm 54 is formed with a counterpart of the lock opening 32 formed through opposite walls thereof for receiving the lock pin 33', and a pair of oppositely projecting fulcrum members 62 for pivotally supporting the inboard post 56 on the second pivot axis 57. In an exemplary configuration of the carrier unit 50, the inboard post 56 is configured as a channel member, having a notch 64 formed in opposite walls thereof for engagement by the lock pin 33 to hold the post in orthogonally projecting relation to the arm 54.

Figure 11:
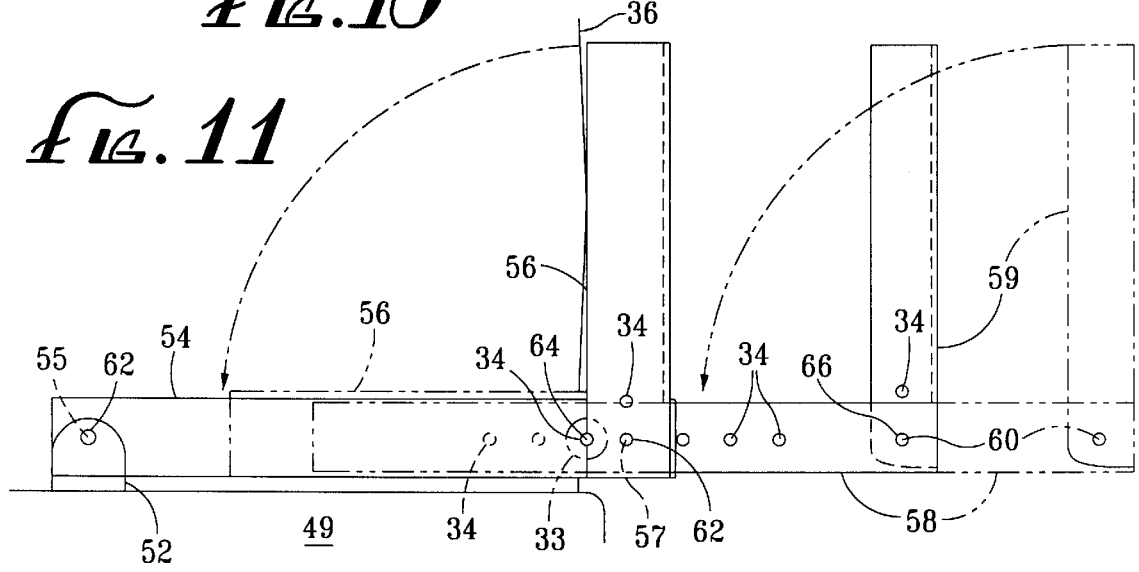
FIG. 11 is a rear elevational view of a folding carrier unit of the apparatus of FIG. 10.
Figure 12:
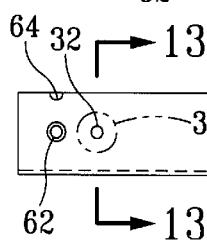
FIG. 12 is a rear view as in FIG. 11, showing the carrier unit in a folded storage condition.
Figure 13:
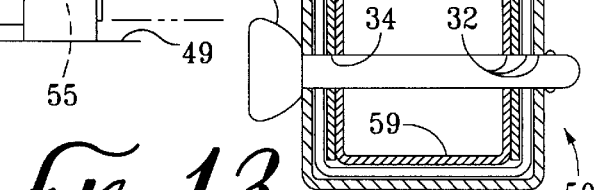
FIG. 13 is a sectional view on line 13—13 in FIG. 12.

The arm 54 has a deployed position shown in FIGS. 10 and 11, and a storage position shown by solid lines in FIG. 12, which also indicates the deployed position by broken lines, the inboard post 56 being folded into overlapping relation in line with the arm 54 prior to movement of the arm to its storage position, as indicated by broken lines in FIG. 11. The outboard post 59 can be formed from rectangular or square tubing, being connected to the sleeve member 58 by a hinge pin 66, the hinge pin being preferably substantially flush with the outside of the sleeve member 58 for permitting the hinge pin 66 to be retracted with the sleeve member 59 into the arm 54, the arm also being formed of square or rectangular tubing sized for receiving the sleeve member as described above in connection with FIGS. 3–7. Also, when the sleeve member 58 is sufficiently withdrawn from the arm 54, the outboard post 59 can be folded into the sleeve member as indicated by broken lines in FIG. 11, thereby permitting the sleeve member 58 and the outboard post 59 to be retracted into the arm 54 as shown in FIGS. 12 and 13. To the extent that the hinge pin 66 projects outwardly from the sleeve 58, the arm 54 can be formed having complementary grooves in inside wall portions thereof for a short distance from the free end of the arm, so that the sleeve 58 and the folded outboard post 59 can be retracted fully flush with the end extremity of the arm 54. Preferably the pivotable connection of the arm 54 to the base 52 is by counterparts of the fulcrum members 62 projecting from the arm 54, for permitting the sleeve member 58 to extend beyond the first pivot axis 55. The sleeve member 58 can be formed as a channel member or, more preferably, a square or rectangular tube having one (upper) wall removed for a sufficient length inwardly from the third pivot axis 60 to receive the outboard post in its folded position between flange portions of the sleeve.

As further shown in FIGS. 10 and 11, the arm 54 in the deployed position thereof holds the inboard post 56 in outwardly projecting relation to the vehicle body 36; however, no part of the carrier unit 50 projects laterally from the vehicle 11 in the storage position of the arm 54.

Although the present invention has been described in considerable detail with reference to certain preferred versions thereof, other versions are possible. For example, the carrier units 50 of FIGS. 10–13 can have an outboard end portion of the sleeve member 58 formed having a reduced cross-section for permitting outboard post 59 (formed as a channel) to straddle the sleeve member when the post is folded in alignment with the sleeve for stowage within the arm 54. Thus a rectangular tubular cross-section can be retained over the full length of the sleeve for enhanced structural integrity as well as providing an improved surface for supporting the load 17. Alternatively, a filler member can be located within the sleeve for providing an auxiliary load-supporting surface, preferably flush with adjacent flange portions of the sleeve 58. In another alternative, the carrier units 50 of FIGS. 10–13 can have counterparts of the outboard post 30 and its supporting sleeve member 24 as described in connection with FIG. 4 substituted for the sleeve member 58 and pivotally connected outboard post 59. This rigid unit can be removed and stored elsewhere, or inserted in inverted relation to the arm 54 when the arm 54 is to be in its storage position. Therefore, the spirit and scope of the appended claims should not necessarily be limited to the description of the preferred versions contained herein.

What is claimed is:

1. Apparatus for carrying a load externally of a vehicle having a body and a chassis including front and rear pairs of laterally disposed wheels, the apparatus comprising a longitudinally spaced plurality of unconnected carrier units, each of the carrier units comprising:
   (a) a socket member;
   (b) means for mounting the socket member transversely to the chassis, an outside extremity of the socket member projecting to proximate alignment with a side extremity of the body;
   (c) a sleeve member telescopically receivable in the socket member;
   (d) a post member;
   (e) means for holding the post member upwardly projecting from the sleeve member when the sleeve member is in the socket member;
   (f) means for securing the post member selectively in plural fixed axial locations relative to the socket member for supporting the load above the sleeve member, wherein at least some of the post members are locatable for laterally restraining opposite sides of the load, and the post member of at least one of the carrier units is selectively locatable in fixed axial locations relative to the sleeve member of the at least one carrier unit.

2. The apparatus of claim 1, wherein the means for mounting of at least one of the carrier units comprises a pair of brackets for laterally spaced engagement with the chassis, and a pair of U-bolts, each of the U-bolts being configured for engaging a corresponding one of the brackets and fixedly clamping the socket member relative to the chassis.

3. The apparatus of claim 2, wherein the means for mounting further comprises a pair of spacers for clamped location between the socket member and the chassis proximate respective ones of the U-bolts.

4. The apparatus of claim 2, wherein the brackets are formed for hook-engagement with the chassis, respective portions of the chassis being clamped between corresponding brackets and the socket member by respective ones of the U-bolts when the socket member is clamped relative to the chassis.

5. The apparatus of claim 1, wherein the means for securing the post member of at least one of the carrier units comprises a lock pin being selectively engagable with plural axially spaced discontinuities of the sleeve member through a lock opening of the socket member.

6. The apparatus of claim 5, wherein the means for holding the post member of the at least one carrier unit upwardly projecting comprises the axially spaced discontinuities of the sleeve member being formed as index openings for receiving the lock member, rotation of the sleeve member within the socket member being prevented by the lock member.

7. The apparatus of claim 1, wherein the means for holding the post member of at least one of the carrier units upwardly projecting comprises the sleeve member and the socket member being formed for non-circularly cylindrical telescopic engagement.

8. The apparatus of claim 7, wherein the sleeve member and the socket member are rectangular in cross-section.

9. The apparatus of claim 7, wherein the means for holding further comprises the post member being rigidly connected to the sleeve member.

10. The apparatus of claim 9, wherein the sleeve member is telescopically engageable with the socket member in a first orientation wherein the post member projects vertically from the sleeve member, and a second orientation wherein the post member projects horizontally from the sleeve member.

11. The apparatus of claim 10, wherein the sleeve member and the socket member are square in cross-section.

12. The apparatus of claim 9, wherein the post member of the at least one carrier unit is an outboard post member being rigidly connected to the sleeve member, the carrier unit further comprising an inboard post member rigidly connected to a collar member, the collar member having telescopic engagement with the sleeve member.

13. The apparatus of claim 12, wherein the means for securing comprises a first lock pin engagable with a selected one of axially spaced discontinuities of the sleeve member through a lock opening of the socket member, and a second lock pin engagable with another of the discontinuities through a lock opening of the collar member.

14. The apparatus of claim 12, wherein the collar member is telescopically engagable between the sleeve member and the socket member, and the means for securing comprises a lock pin engagable with a selected one of axially spaced discontinuities of the sleeve member through a lock opening of the socket member and a selected one of axially spaced index openings of the collar member.

15. The apparatus of claim 1, in combination with the vehicle.

16. The apparatus of claim 15, wherein the socket member of at least one of the carrier units forms a portion of a bumper of the vehicle.

17. The apparatus of claim 1, further comprising:
   (a) a base for fixed mounting proximate an end portion of the vehicle, wherein the socket member of at least one of the carrier units is pivotally connected to the base on a pivot axis as an arm having a deployed position extending laterally with a free end of the arm forming the outside extremity of the socket member, and a retracted position projecting oppositely from the pivot axis;
   (b) the post member being an outboard post member connected to the sleeve member for supporting the load against lateral movement away from the body of the vehicle; and
   (c) an inside post member hingedly connected to the arm proximate the free end thereof, the inside post member having a deployed position projecting upwardly from the arm in the deployed position thereof for laterally spacing the load away from the side extremity of the body, and a folded position extending approximately parallel to the arm.

18. The apparatus of claim 17, wherein the outboard post member is hingedly connected to the sleeve member, the outboard post member having a deployed position for the supporting of the load, and a folded position extending approximately parallel to the sleeve member, the sleeve member and the outboard post member in the folded position thereof being retractable into the arm to proximate the free end thereof.

19. Apparatus for carrying a load externally of a vehicle having a body and a chassis including front and rear pairs of laterally disposed wheels, the apparatus comprising a longitudinally spaced plurality of carrier units, each of the carrier units comprising:
   (a) a socket member;
   (b) means for mounting the socket member transversely to the chassis, an outside extremity of the socket member projecting to proximate alignment with a side extremity of the body, the means for mounting of at least one of the carrier units comprising a pair of brackets for laterally spaced engagement with the chassis, and a pair of U-bolts, each of the U-bolts being configured for engaging a corresponding one of the brackets and fixedly clamping the socket member relative to the chassis;
   (c) a sleeve member telescopically receivable in the socket member;
   (d) a post member;
   (e) means for holding the post member upwardly projecting from the sleeve member when the sleeve member is in the socket member, wherein the means for holding the post member of at least one of the carrier units upwardly projecting comprises the sleeve member and the socket member being formed for non-circularly cylindrical telescopic engagement;
   (f) means for securing the post member selectively in plural fixed axial locations relative to the socket member for supporting the load above the sleeve member, the means for securing the post member of at least one of the carrier units comprising a lock pin being selectively engageable with plural axially spaced discontinuities of the sleeve member through a lock opening of the socket member,
   wherein at least some of post members are locatable for laterally restraining opposite sides of the load.

* * * * *